(12) United States Patent
Okamura et al.

(10) Patent No.: US 11,794,970 B2
(45) Date of Patent: *Oct. 24, 2023

(54) PACKAGE, GAS BARRIER LAMINATE, AND PACKAGING BODY

(71) Applicant: TOPPAN PRINTING CO., LTD., Tokyo (JP)

(72) Inventors: Kengo Okamura, Tokyo (JP); Miki Fukugami, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,593

(22) Filed: Jul. 16, 2021

(65) Prior Publication Data
US 2021/0339926 A1 Nov. 4, 2021

Related U.S. Application Data

(63) Continuation of application No. PCT/JP2020/000531, filed on Jan. 9, 2020.

(30) Foreign Application Priority Data

Jan. 17, 2019 (JP) ................. 2019-006104
Jan. 17, 2019 (JP) ................. 2019-006109
Jun. 5, 2019 (JP) ................. 2019-105354

(51) Int. Cl.
*B65D 65/40* (2006.01)
*B32B 1/00* (2006.01)
(Continued)

(52) U.S. Cl.
CPC ............... *B65D 65/40* (2013.01); *B32B 1/00* (2013.01); *B32B 7/12* (2013.01); *B32B 27/08* (2013.01);
(Continued)

(58) Field of Classification Search
CPC ........ C08J 7/043; C08J 7/048; C08J 2433/02; C08J 2475/08; C23C 14/081; C23C 16/0272; C23C 16/403
See application file for complete search history.

(56) References Cited

U.S. PATENT DOCUMENTS

2018/0230319 A1 8/2018 Matsui et al.
2020/0331024 A1 10/2020 Okamura et al.

FOREIGN PATENT DOCUMENTS

EP 3 006 369 A1 4/2016
EP 3 741 560 A1 11/2020
(Continued)

OTHER PUBLICATIONS

International Searching Authority, "International Search Report," issued in connection with International Patent Application No. PCT/JP2020/000053, dated Feb. 18, 2020.
(Continued)

*Primary Examiner* — Michael C Miggins
(74) *Attorney, Agent, or Firm* — Foley & Lardner LLP

(57) ABSTRACT

A packaging body constituted by a sheet that includes a gas barrier laminate and a sealant; and contents that are accommodated in the packaging body and that contain a sulfur-containing amino acid. The gas barrier laminate comprises: a resin substrate; a first layer containing an inorganic oxide; a second layer containing a carboxylic acid polymer; and a third layer containing a polyvalent metal compound and a resin. The resin substrate, the first layer, the second layer, and the third layer are layered in this order from the outside to the inside of the packaging body. The thickness of the third layer is 0.1 μm or more. The sulfur content of the second layer is 1.0 atm % or less.

7 Claims, 6 Drawing Sheets

(51) Int. Cl.
*B32B 7/12* (2006.01)
*B32B 27/08* (2006.01)
*B32B 27/16* (2006.01)
*B32B 27/32* (2006.01)
*B32B 27/36* (2006.01)
*B65D 81/26* (2006.01)

(52) U.S. Cl.
CPC .............. *B32B 27/16* (2013.01); *B32B 27/32* (2013.01); *B32B 27/36* (2013.01); *B65D 81/266* (2013.01); *B32B 2255/08* (2013.01); *B32B 2255/20* (2013.01); *B32B 2255/26* (2013.01); *B32B 2307/518* (2013.01); *B32B 2307/7242* (2013.01); *B32B 2439/00* (2013.01)

(56) References Cited

FOREIGN PATENT DOCUMENTS

| JP | 4365826 B2 | 11/2009 |
| JP | 2012-139942 A | 7/2012 |
| JP | 2014-061682 A | 4/2014 |
| JP | 2014-065155 A1 | 4/2014 |
| JP | 2015-150836 A | 8/2015 |
| JP | 2015-160622 A | 9/2015 |
| JP | 2018-024816 A | 2/2018 |
| WO | WO-2017/069143 A1 | 4/2017 |
| WO | WO-2019/142923 A1 | 7/2019 |

OTHER PUBLICATIONS

International Searching Authority, "Written Opinion," issued in connection with International Patent Application No. PCT/JP2020/000053, dated Mar. 17, 2020.

International Searching Authority, "International Search Report," issued in connection with International Patent Application No. PCT/JP2020/000531, dated Mar. 17, 2020.

International Searching Authority, "Written Opinion," issued in connection with International Patent Application No. PCT/JP2020/000531, dated Mar. 17, 2020.

Office Action issued in corresponding Chinese Patent Application No. 202080008693.2, dated Aug. 31, 2022.

European Extended Search Report, dated Feb. 2, 2022, issued in corresponding European Patent Application No. 20741631.4, (11 pages).

Office Action issued in corresponding Japanese Patent Application No. 2019-006109, dated Mar. 7, 2023.

Office Action issued in corresponding Japanese Patent Application No. 2019-006104, dated Mar. 7, 2023.

PACKAGE, GAS BARRIER LAMINATE, AND PACKAGING BODY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/000531, filed on Jan. 9, 2020, which is based upon and claims the benefit of priority to Japanese Patent Application Nos. 2019-006104, and 2019-006109, both filed on Jan. 17, 2019; and 2019-105354, filed on Jun. 5, 2019; the disclosures of which are incorporated herein by reference in their entireties.

BACKGROUND

Technical Field

The present disclosure relates to a package, a gas barrier laminate, and a packaging body.

Background Art

In many fields such as food products, beverages, pharmaceutical products, and chemical products, packaging bodies have been developed according to the contents thereof. Such packaging bodies are required to have a function of preventing degradation of the contents. In order to allow the packaging bodies to have the function of preventing degradation of the contents, for example, the packaging bodies are provided with properties for preventing the permeation of oxygen, water vapor, and the like (gas barrier properties). For example, PTL 1 below discloses a gas barrier laminate including a layer in which at least some of the —COO— groups contained in the carboxylic acid-based polymer are neutralized with metal ions having a valence of two or more (polyvalent metal ions). Such a gas barrier laminate is used, for example, for packaging bodies used in pressure-heat sterilization treatment (retort treatment). Thus, even after a packaging body is subjected to retort treatment, the oxygen barrier properties of the packaging body are ensured. The oxygen barrier properties refer to characteristics that prevent oxygen permeation.

[Citation List] [Patent Literature] [PTL 1] JP 4365826 B.

SUMMARY OF THE INVENTION

Technical Problem

When the contents of a product subjected to retort treatment contains sulfur, an unpleasant odor (retort odor) derived from the sulfur can sometimes be generated inside the packaging body. Thus, the sulfur that causes the retort odor may be capable of being absorbed by the gas barrier laminate. However, when the substance is absorbed by the gas barrier laminate, the oxygen barrier properties tend to deteriorate.

An object of an aspect of the present disclosure is to provide a package capable of achieving both oxygen barrier properties and prevention of retort odor.

Means for Solving the Problem

As a result of diligent studies, the present inventors have found that the sulfur generated from the contents during heat sterilization treatment such as retort treatment binds to the polyvalent metal ions of a polyvalent metal compound bonded to a carboxylic acid polymer. Consequently, it has been found that, even though the retort odor can be prevented by a conventional gas barrier laminate, the oxygen barrier properties of the gas barrier laminate deteriorate. The present inventors have completed the aspect of the present disclosure described below following additional studies based on the above findings.

A package according to an aspect of the present disclosure comprises: a packaging body constituted by a sheet that includes a gas barrier laminate and a sealant; and contents that are accommodated in the packaging body and that contain a sulfur-containing amino acid. The gas barrier laminate comprises a resin substrate, a first layer containing an inorganic oxide, a second layer containing a carboxylic acid polymer, and a third layer containing a polyvalent metal compound and a resin; the resin substrate, the first layer, the second layer, and the third layer are layered in that order from the outside to the inside of the packaging body; the thickness of the third layer is 0.1 µm or more; and the sulfur content of the second layer is 1.0 atm % or less.

The gas barrier laminate constituting the packaging body of the package is provided with a third layer containing a polyvalent metal compound and a resin. As a result, for example, the sulfur generated from the contents during retort treatment and the like chemically reacts with the polyvalent metal compound in the third layer. Consequently, the sulfur is retained in the gas barrier laminate, and retort odor can be prevented. Here, because the thickness of the third layer is 0.1 µm or more, a sufficient amount of the polyvalent metal compound can be contained in the third layer. In addition, the sulfur content of the second layer is 1.0 atm % or less. In this case, because the sulfur is well retained in the third layer, the sulfur is prevented from reaching the second layer. Consequently, because the adverse effects of the sulfur on the second layer can be prevented, the oxygen barrier properties exhibited by the second layer can be maintained. Therefore, by using the package described above, it is possible to achieve both oxygen barrier properties and prevention of retort odor, even when the contents that are accommodated contain a sulfur-containing amino acid.

The polyvalent metal compound may be zinc oxide.

The second layer may have a crosslinked structure in which the carboxylic acid polymers are crosslinked with each other via metal ions. In this case, the oxygen barrier properties of the second layer are well exhibited.

A package according to another aspect of the present disclosure comprises: a packaging body constituted by a sheet that includes a gas barrier laminate and a sealant; and contents that are accommodated in the packaging body and that contain a sulfur-containing amino acid. The gas barrier laminate comprises a resin substrate, a first layer containing an inorganic oxide, a second layer containing a carboxylic acid polymer, and a third layer containing zinc oxide and a resin; the resin substrate, the first layer, the second layer, and the third layer are layered in this order from the outside to the inside of the packaging body; the thickness of the third layer is 0.1 µm or more; the ratio of the thickness of the third layer to the thickness of the second layer is 1.0 or more; and the ultraviolet absorbance of the packaging body corresponding to a value obtained by subtracting the absorbance of the packaging body at a wavelength of 500 nm from the absorbance of the packaging body at a wavelength of 350 nm measured by absorptiometry has a value of 0.05 or more.

The gas barrier laminate constituting the packaging body of the package is provided with a third layer containing a zinc oxide and a resin. In this case, for example, the sulfur generated from the contents during heat sterilization treatment such as retort treatment and the like chemically reacts with the zinc oxide in the third layer. Consequently, the sulfur is retained in the gas barrier laminate, and retort odor can be prevented. Furthermore, at least some of the zinc ions generated from the zinc oxide contained in the third layer diffuse into the second layer during the heat sterilization treatment. Then, the diffused zinc ions react with the carboxylic acid polymer. In this case, a crosslinked structure is formed in which the carboxylic acid polymers are ionically crosslinked with each other via zinc ions. As a result, because the oxygen barrier properties of the second layer improve, the first layer and the second layer enable the gas barrier laminate to exhibit excellent oxygen barrier properties. Here, if the sulfur generated from the contents as a result of heat sterilization treatment reaches the second layer, the zinc ions constituting the crosslinked structure of the second layer react with the sulfur ions. In this case, because the crosslinked structure is destroyed, the oxygen barrier properties of the gas barrier laminate might deteriorate. In contrast, in the packaging body described above, the thickness of the third layer is 0.1 μm or more, the ratio of the thickness of the third layer to the thickness of the second layer is 1.0 or more, and the ultraviolet absorbance of the packaging body is 0.05 or more. When all of these conditions are satisfied, a sufficient amount of zinc ions for the second layer to exhibit oxygen barrier properties diffuses from the third layer to the second layer, and further, even if the zinc oxide in the third layer chemically reacts with sulfur during heat sterilization treatment, zinc oxide still remains in the third layer. In this case, because the sulfur is sufficiently retained in the third layer, it is possible to prevent the sulfur from reaching the second layer. Consequently, because the adverse effects of the sulfur on the second layer can be prevented, the oxygen barrier properties exhibited by the second layer can be maintained. Therefore, by using the package described above, it is possible to achieve both oxygen barrier properties and prevention of retort odor, even when the contents that are accommodated contain a sulfur-containing amino acid The thickness of the third layer may be 0.5 μm or less. In this case, reduction in the flexibility of the third layer can be well prevented.

The sulfur content of the third layer may be 1.0 atm % or more and 15 atm % or less. In this case, because the sulfur generated from the contents is well retained inside the third layer, retort odor is prevented effectively.

The gas barrier laminate may be located between the resin substrate and the first layer, and may include a base layer containing an organic compound. In this case, separation of the resin substrate and the first layer can be prevented.

A gas barrier laminate according to another aspect of the present disclosure is a gas barrier laminate for use as a packaging body to be subjected to retort treatment or boiling treatment. The gas barrier laminate includes a resin substrate, a first layer which is located on the resin substrate and includes an inorganic oxide, a second layer which is located on the first layer and includes a carboxylic acid polymer, a third layer which is located on the second layer and includes a polyvalent metal compound and a resin; the thickness of the third layer is 0.1 μm or more; and after 150 mL of a 0.3 mass % cysteine aqueous solution is accommodated in a packaging body constituted by the gas barrier laminate and having an inner area of 400 $cm^2$, and the packaging body is subjected to heat treatment with water vapor at 125° C. for 30 minutes, a resulting sulfur content of the second layer is 1.0 atm % or less.

The gas barrier laminate includes a third layer containing a polyvalent metal compound and a resin. As a result, when the above heat treatment is performed with respect to the packaging body described above using the gas barrier laminate, the sulfur generated from the contents chemically reacts with the polyvalent metal compound in the third layer. Consequently, the sulfur is retained in the gas barrier laminate, and retort odor can be prevented. Here, because the thickness of the third layer is 0.1 μm or more, a sufficient amount of the polyvalent metal compound can be contained in the third layer. In addition, after performing the above heat treatment with respect to the packaging body, the sulfur content of the second layer is 1.0 atm % or less. As a result, most of the sulfur generated from the aqueous cysteine solution is retained in the third layer, and the sulfur is prevented effectively from reaching the second layer. Consequently, a sufficient number of polyvalent metal ions that are not bound to sulfur can be present in the second layer. Therefore, even when sulfur is present in the contents, the oxygen barrier properties of the gas barrier laminate are well exhibited.

The thickness of the third layer may be 0.5 μm or less. In this case, reduction in the flexibility of the third layer can be well prevented.

After performing the heat treatment described above, the sulfur content of the third layer may be 1.0 atm % or more and 15 atm % or less. In this case, because the sulfur generated from the contents is well retained inside the third layer, the retort odor is well suppressed.

The polyvalent metal compound may be zinc oxide, and the content of the zinc oxide may be in the range of 65 mass % or more and 85 mass % or less relative to the mass of the third layer. In this case, it is possible to provide a gas barrier laminate that has light transmissivity and can achieve both oxygen barrier properties and prevention of retort odor.

The second layer may have a crosslinked structure in which the carboxylic acid polymers are crosslinked with each other via polyvalent metal ions. In this case, the oxygen barrier properties of the second layer are well exhibited.

The gas barrier laminate may be located between the resin substrate and the first layer, and may be further provided with a base layer containing an organic compound. In this case, separation of the resin substrate and the first layer can be prevented.

Another aspect of the present disclosure is a packaging body including the gas barrier laminate described above. When such a packaging body is filled with the contents and subjected to the above heat treatment, the sulfur generated from the contents is absorbed by the gas barrier laminate. As a result, retort odor can be prevented. In addition, because the gas barrier laminate displays the performance mentioned above with respect to the above heat treatment, it is possible for oxygen barrier properties to also be exhibited.

Advantageous Effects of the Invention

According to an aspect of the present disclosure, it is to provide a package capable of achieving both oxygen barrier properties and prevention of retort odor.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

First Embodiment

Summary of Package

Figure 1:
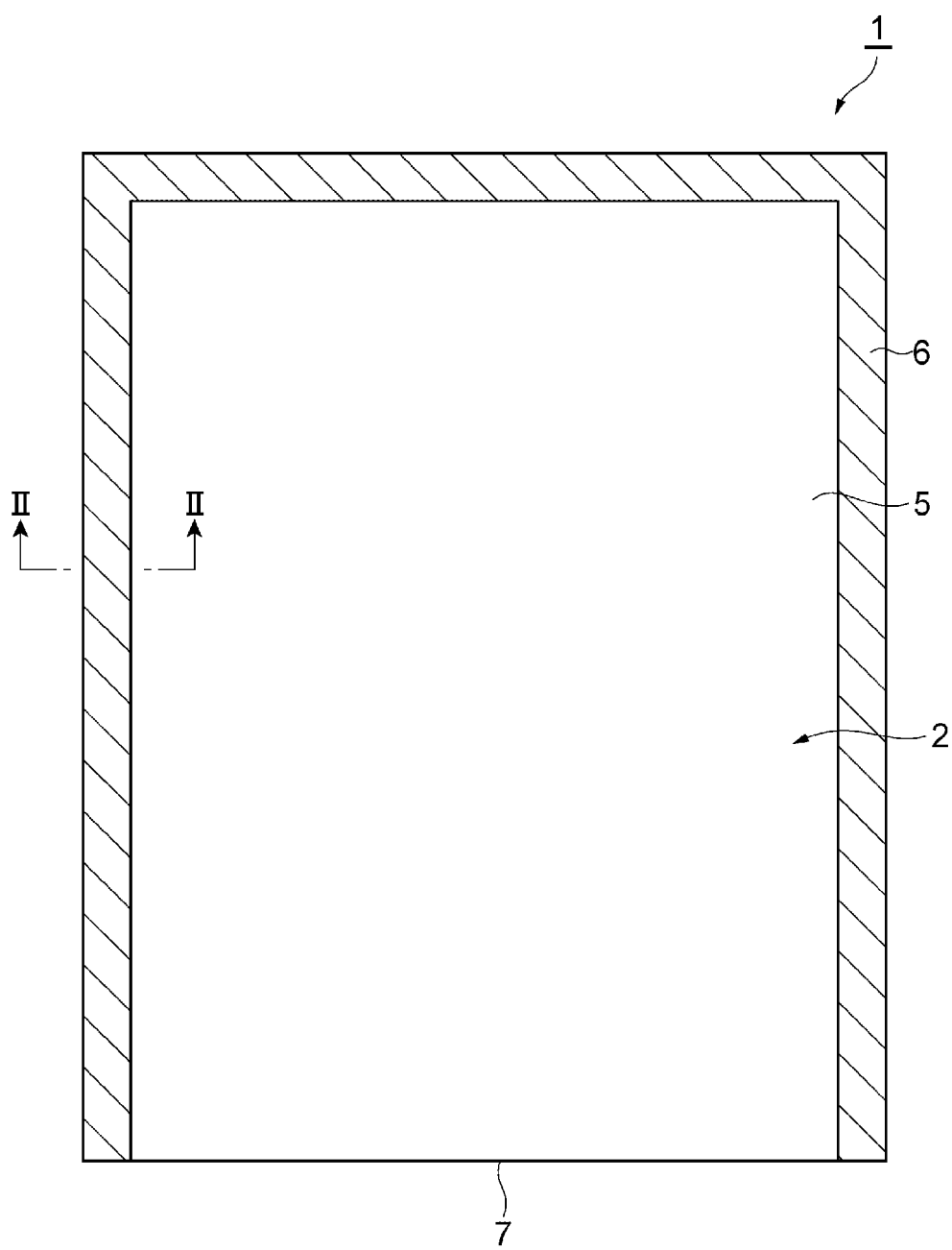
FIG. 1 is a schematic plan view of a package.
Figure 2:
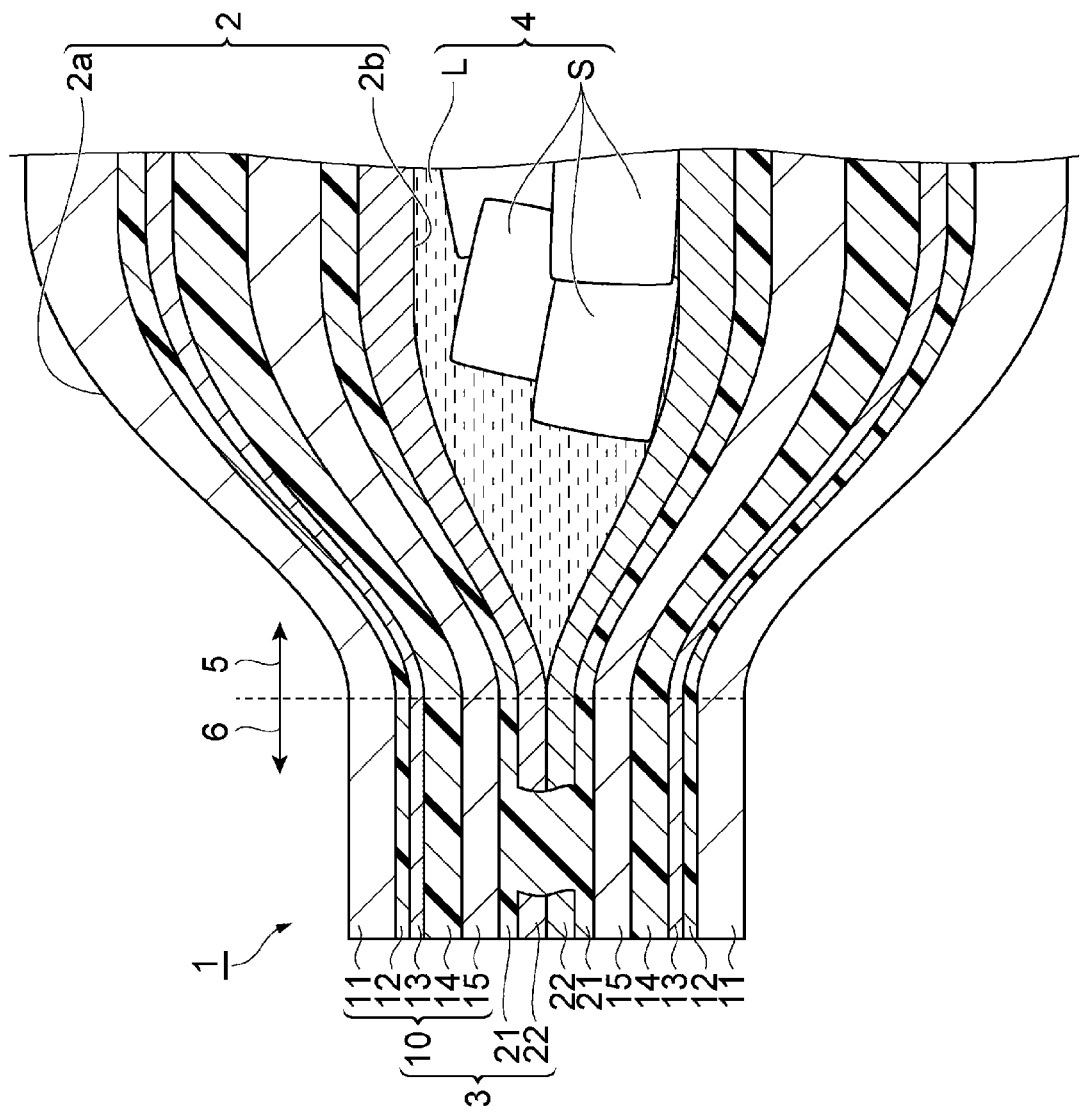
FIG. 2 is a cross-sectional view taken along line II-II in FIG. 1.

A package according to a first embodiment will be described with reference to FIG. 1 and FIG. 2. FIG. 1 is a schematic plan view of the package. FIG. 2 is a cross-sectional view taken along line II-II in FIG. 1.

The package 1 shown in FIG. 1 and FIG. 2 is a sealed container that accommodates a liquid, a solid, or the like. The package 1 can be subjected to pressure-heat sterilization treatment (retort treatment) or boiling treatment. The retort treatment is, for example, moist-heat sterilization treatment as specified in the Food Sanitation Law of Japan. The boiling treatment is sterilization treatment in which an object is heated in hot water. The retort treatment is sterilization treatment carried out at 100° C. or more. On the other hand, the boiling treatment is sterilization treatment carried out at less than 100° C. In the first embodiment, the package 1 is subjected to retort treatment. As a specific example, the package 1 may be exposed to water vapor at 125° C. for 30 minutes.

The package 1 comprises a packaging body 2 configured by a sheet 3, and contents 4 accommodated in the packaging body 2. The packaging body 2 is formed in a bag shape by, for example, folding the sheet 3 in half and then heat sealing the edge of the sheet 3. The shape of the packaging body 2 and the configuration of the sheet 3 will be described in detail later. The contents 4 contain, for example, a liquid L and solids S. The liquid L is, for example, water, oil, a soft drink, an alcoholic beverage, an organic solvent, or the like. The solids S are meat, beans, or the like, that contain a sulfur-containing amino acid. The sulfur-containing amino acid is, for example, methionine or cysteine. The cysteine is, for example, L-cysteine (2-amino-3-sulfanyl propionic acid: $HSCH_2CH(NH_2)COOH$), and is expressed by the following chemical formula (1). The contents 4 may be vacuum-packed in the packaging body 2. Alternatively, the contents 4 and a gas may be accommodated in the package 2. The gas may be air or an inert gas. From the viewpoint of preventing deterioration of the contents 4, the gas may be an inert gas.

[Chemical Formula 1]

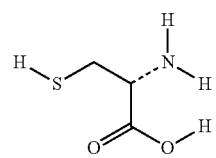

(1)

Sheet

Figure 3:
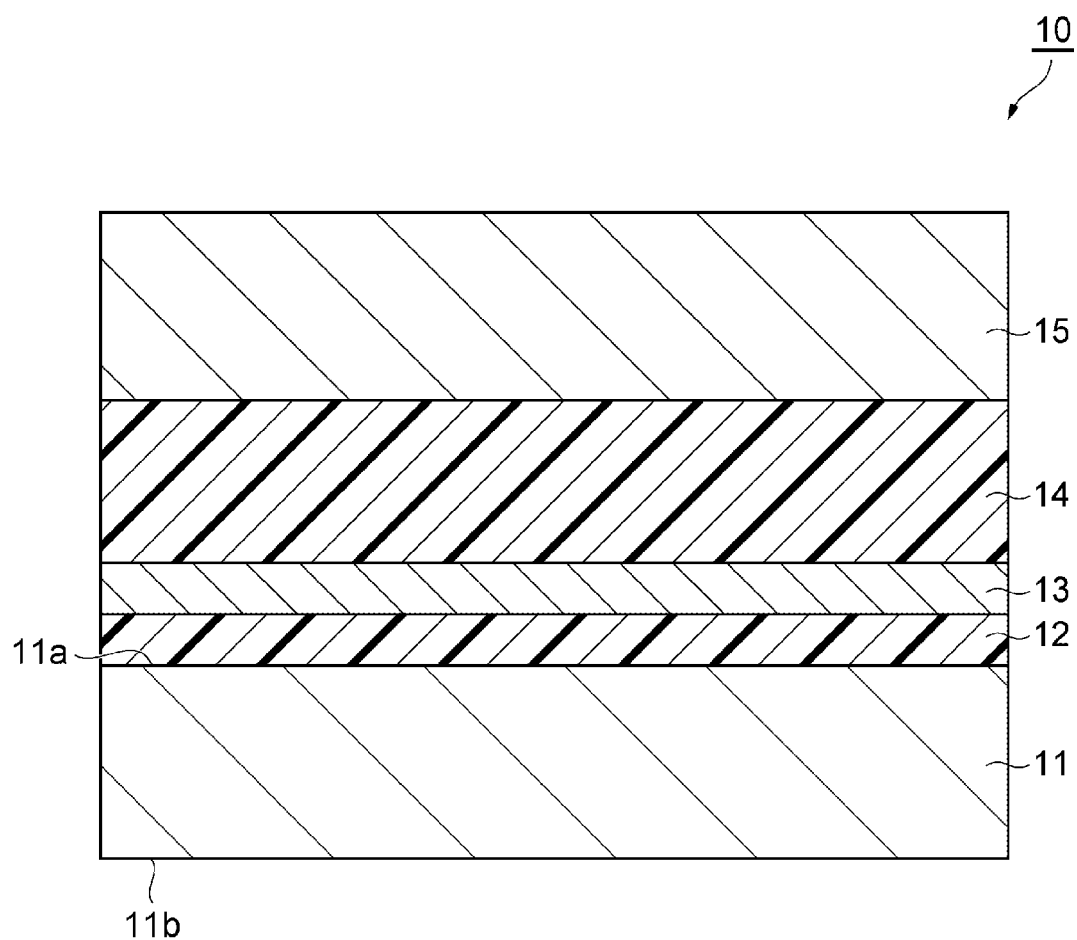
FIG. 3 is a schematic cross-sectional view of a gas barrier laminate.

Here, the sheet 3 constituting the packaging body 2 will be described in detail with reference to FIG. 2 and FIG. 3. FIG. 3 is a schematic cross-sectional view of the gas barrier laminate contained in the sheet. The sheet 3 includes the gas barrier laminate 10, an adhesive layer 21 located on the gas barrier laminate 10, and a cover layer 22 located on the adhesive layer 21. Unless otherwise specified, the gas barrier laminate 10 described below represents a laminate used for a packaging body after being subjected to retort treatment or boiling treatment, or represents a laminate used for a packaging body during retort treatment or boiling treatment.

Gas Barrier Laminate

The gas barrier laminate 10 shown in FIG. 2 and FIG. 3 is a film that has at least gas barrier properties against oxygen, water vapor, and the like. The gas barrier laminate 10 has, for example, at least one of flexibility, light transmissivity, and the like. As described above, because the package 1 can be subjected to retort treatment or boiling treatment, the gas barrier laminate 10 also needs to exhibit heat resistance. The gas barrier laminate 10 may have properties that are required in addition to the gas barrier properties and the heat resistance (such as light shielding properties, water resistance, temperature and humidity resistance, mechanical strength, ease of printing, and ease of decoration). The gas barrier properties refer to characteristics that prevent permeation of gases such as oxygen and water vapor.

The gas barrier laminate 10 includes a resin substrate 11, a base layer 12, a first layer 13, a second layer 14, and a third layer 15. The resin substrate 11, the base layer 12, the first layer 13, the second layer 14, and the third layer 15 are laminated in this order.

The resin substrate 11 is a resin film (plastic film) serving as a support. The resin substrate 11 is, for example, a film containing at least one of a polyolefin polymer and an acid-modified product thereof; a polyester polymer; a polyamide polymer; a polyether polymer; a halogen polymer; an acrylic polymer; a polyimide polymer; and an epoxy polymer. Thus, the resin substrate 11 may be a copolymer of monomers constituting the above polymer. The resin substrate 11 may contain, for example, a natural polymer compound such as cellulose acetate. The resin substrate 11 may be a stretched film or a non-stretched film. The resin substrate 11 may have a thickness, for example, in the range of 5 μm or more and 10 mm or less, more preferably in the range of 5 μm or more and 800 μm or less, or even more preferably in the range of 5 μm or more and 500 μm or less.

The resin substrate 11 has a first surface 11a that is in contact with the base layer 12, and a second surface 11b that is located on a side opposite to the first surface 11a in the thickness direction of the resin substrate 11. From the viewpoint of adhesion to the base layer 12, the first surface 11a may be subjected to surface treatment. The surface treatment is, for example, corona treatment, flame treatment, plasma treatment, or the like. On the second surface 11b, for example, a barrier layer such as a barrier film, an inorganic vapor deposition film, or a metal foil may be provided. Such a barrier layer has, for example, a function of inhibiting liquid and air from passing through the resin substrate 11, a function of preventing light from passing through the resin substrate 11, and the like. The barrier film is, for example, a film formed of polyvinylidene chloride (PVDC), ethylene-vinyl alcohol copolymer (EVOH), polyacrylonitrile (PAN), polyvinyl alcohol (PVA), or the like. The inorganic vapor deposition film is a film obtained by depositing aluminum, alumina, silica, or the like on a resin film.

The base layer 12 is a layer that contributes to improving the adhesion between the resin substrate 11 and the first layer 13, and contains an organic compound such as a urethane compound. The base layer 12 has a thickness, for example, in the range of 0.01 μm or more and 2 μm or less. The base layer 12 may have a thickness in the range of 0.05 μm or more and 1 μm or less. When the base layer 12 has a thickness of 0.01 μm or more, the characteristics of the base layer 12 are well exhibited. When the base layer 12 has a thickness of 2 μm or less, a reduction in the flexibility of the gas barrier laminate 10 can be well prevented. Thus, when the gas barrier laminate 10 is bent, occurrence of cracking in the base layer 12 can be prevented. The base layer 12 is formed by coating a first surface 11a of the resin substrate 11 with, for example, a liquid containing a urethane compound (an anchor coating liquid), and then drying the anchor coating liquid. The solvent of the anchor coating liquid is, for example, a polar solvent. The anchor coating liquid is applied to the first surface 11a, for example, by a known method such as offset printing, gravure printing, roll coating, or doctor blading. The applied anchor coating liquid may be dried in a temperature environment higher than room temperature. By drying the applied anchor coating liquid, at least part of the solvent contained in the anchor coating liquid is removed.

The urethane compound contained in the base layer 12 is, for example, a reaction product of an organosilane or organometallic compound, a polyol compound, and an isocyanate compound. The organosilane may be, for example, trifunctional organosilane, or a hydrolysate of trifunctional organosilane. The metal element contained in the organometallic compound is, for example, Al, Ti, Zr, or the like. The organometallic compound is, for example, a metal alkoxide, or a hydrolysate of metal alkoxide. The hydrolysate of trifunctional organosilane and the hydrolysate of metal alkoxide may each have at least one hydroxyl group. From the viewpoint of reactivity of the polyol compound with the isocyanate compound, the polyol compound may be a polymer. In this case, from the viewpoint of transparency, the polyol compound may be an acrylic polyol. The isocyanate compound mainly functions as a crosslinking agent or a curing agent. The isocyanate compound may be a monomer or a polymer.

The first layer 13 is a layer having gas barrier properties against water vapor (water barrier properties), is located on the base layer 12, and contains an inorganic compound. Examples of the inorganic oxide include aluminum oxide, silicon oxide, magnesium oxide, and tin oxide. From the viewpoint of transparency and water barrier properties of the first layer 13, the inorganic oxide may be selected from the group consisting of aluminum oxide, silicon oxide, and magnesium oxide. The first layer 13 has a thickness in the range of 5 nm or more and 100 nm or less. The first layer 13 may preferably have a thickness in the range of 10 nm or more and 50 nm or less. When the first layer 13 has a thickness of 5 nm or more, water barrier properties against water vapor are sufficiently exhibited. When the first layer 13 has a thickness of 100 nm or less, a reduction in the flexibility of the gas barrier laminate 10 can be well prevented. Thus, when the gas barrier laminate 10 is bent, occurrence of cracking in the first layer 13 can be prevented. The first layer 13 may contain a plurality of types of inorganic oxides.

The first layer 13 is a vapor deposition layer formed, for example, by physical vapor deposition, chemical vapor deposition, or the like. The physical vapor deposition is, for example, vacuum vapor deposition, sputtering, ion plating, or the like. From the viewpoint of improving the adhesion of the first layer 13 to the base layer 12 and the density of the first layer 13, a plasma assisted method, an ion beam assisted method, or the like may be performed. From the viewpoint of improving the transparency of the first layer 13, during formation of the first layer 13, oxygen gas or the like may be supplied into the production chamber.

The second layer 14 is a layer having gas barrier properties against oxygen (oxygen barrier properties), is located on the first layer 13, and contains a carboxylic acid polymer. The second layer 14 has a thickness, for example, in the range of 0.01 μm or more and 5 μm or less. The second layer 14 may have a thickness, for example, in the range of 0.01 μm or more and 4 μm or less, more preferably in the range of 0.02 μm or more and 3 μm or less, or even more preferably in the range of 0.04 μm or more and 1.2 μm or less. When the second layer 14 has a thickness of 0.01 μm or more, the oxygen barrier properties are well exhibited. When the second layer 14 has a thickness of 5 μm or less, a reduction in the flexibility of the gas barrier laminate 10 can be well prevented. The thickness of the second layer 14 may be adjusted such that the ratio of the thickness of the third layer 15 described below to the thickness of the second layer 14 is within a predetermined range. The second layer 14 is formed by coating the first layer 13 with, for example, a coating liquid containing at least a carboxylic acid polymer, and then drying the coating liquid. The coating solution is applied onto the first layer 13 using the same method as the anchor coat layer described above. The solvent of the coating solution needs to contain at least one of water and an organic solvent. The applied coating liquid may be dried in a temperature environment higher than room temperature. By drying the applied coating liquid, at least part of the solvent contained in the coating liquid is removed.

Examples of the carboxylic acid polymer contained in the second layer 14 include an ethylenically unsaturated carboxylic acid polymer; a copolymer of an ethylenically unsaturated carboxylic acid monomer and another ethylenically unsaturated monomer; and acidic polysaccharides having a carboxyl group in a molecule of alginic acid, carboxymethyl cellulose, pectin, or the like. The ethylenically unsaturated carboxylic acid may be, for example, acrylic acid, methacrylic acid, itaconic acid, maleic acid, fumaric acid, or crotonic acid. The ethylenically unsaturated monomer may be, for example, a saturated carboxylic acid vinyl ester monomer (ethylene, propylene, vinyl acetate, or the like), an alkyl acrylate monomer, an alkyl methacrylate monomer, an alkyl itaconate monomer, vinyl chloride, vinylidene chloride, styrene, acrylamide, acrylonitrile, or the like. The second layer 14 may contain a plurality of types of carboxylic acid polymers. The carboxylic acid polymer may be a polymer of monomers having two or more carboxy groups.

From the viewpoint of the oxygen barrier properties of the second layer 14, the carboxylic acid polymer may be a polymer containing a constituent unit derived from at least one polymerizable monomer selected from the group consisting of acrylic acid, maleic acid, methacrylic acid, itaconic acid, fumaric acid, and crotonic acid. In this case, the ratio of the constituent unit in the polymer may be 80 mol % or more, or 90 mol % or more.

The carboxylic acid polymer has a number average molecular weight, for example, in the range of 2,000 or more and 10,000,000 or less. The carboxylic acid polymer may preferably have a number average molecular weight in the range of 5,000 or more and 1,000,000 or less. When the carboxylic acid polymer has a number average molecular weight of 2,000 or more, the second layer 14 has a sufficient water resistance. Thus, deterioration of the oxygen barrier properties of the second layer 14 due to moisture, and blushing of the second layer 14, can be well suppressed. When the carboxylic acid polymer has a number average molecular weight of 10,000,000 or less, the second layer 14 can be easily formed. The number average molecular weight of the carboxylic acid polymer is obtained by gel permeation chromatography (GPC), and is and expressed relative to polystyrene.

From the viewpoint of improvement of adhesion between the first layer 13 and the second layer 14, the second layer 14 may contain at least one silicon-containing compound selected from the group consisting of a silane coupling agent, a hydrolysate of the silane coupling agent, and condensates of the silane coupling agent and the hydrolysate. In this case, the heat resistance, water resistance, and the like of the second layer 14 can be improved. The silane coupling agent may be, for example, γ-glycidoxypropyltrimethoxysilane, γ-glycidoxypropyltriethoxysilane, γ-aminopropyltrimethoxysilane, γ-aminopropyltriethoxysilane, or the like. The hydrolysate of the silane coupling agent is a hydrolysate in which at least one of alkyl groups bound to oxygen of the coupling agent is substituted by a hydroxyl group. The condensate of the silane coupling agent has, for example, Si—O—Si bonds (siloxane bond) formed by condensation of the Si—OH groups of two hydrolysate molecules. When the second layer 14 contains a silicon-containing compound, the mass ratio of the carboxylic acid polymer to the silicon-containing compound is, for example, in the range of 99.5:0.5 to 80:20. In this case, a gas barrier laminate 10 having excellent resistance to abuse is obtained. Furthermore, separation of the first layer 13 and the second layer 14 is less likely to occur. In addition, the second layer 14 is more likely to have a uniform thickness, and the second layer 14 can have good acid resistance.

Some of the carboxy groups contained in the carboxylic acid polymer may be neutralized in advance with a basic compound. In this case, the oxygen barrier properties of the second layer 14 can be further improved. In addition, the heat resistance of the second layer 14 can also be improved. Examples of the basic compound include a polyvalent metal compound, a monovalent metal compound, and ammonia. The polyvalent metal compound is, for example, the same as a polyvalent metal compound contained in the third layer 15 (described later in detail). The basic compound which is a polyvalent metal compound is, for example, zinc oxide, calcium carbonate, sodium carbonate, or the like. The basic compound which is a monovalent metal compound is, for example, sodium hydroxide, potassium hydroxide, or the like.

In the first embodiment, the second layer 14 contains at least the cations constituting a basic compound. The cations are polyvalent metal ions that have diffused from the third layer 15 to the second layer 14. Therefore, in the first embodiment, ionic crosslinking is formed by the polyvalent metal ions and the carboxy groups. In other words, the second layer 14 has a crosslinked structure in which the carboxylic acid polymers are crosslinked with each other via the polyvalent metal ions. As a result, the second layer 14 is capable of exhibiting excellent oxygen barrier properties. For example, the gas barrier laminate 10 has an oxygen permeability of 0.1 cc/m$^2$·day·atm or less.

In the first embodiment, the sulfur content of the second layer 14 is 1.0 atm % or less. Consequently, even after the package 1 has been subjected to retort treatment as described above, the crosslinked structure sufficiently remains in the second layer 14. Therefore, the oxygen barrier properties of the gas barrier laminate 10 are well exhibited.

The second layer 14 may contain various additives. Examples of additives include a plasticizer, a resin, a dispersant, a surfactant, a softener, a stabilizer, an anti-blocking agent, a film forming agent, a tackifier, and an oxygen absorber.

The third layer 15 is a layer for absorbing the sulfur that causes the retort odor. The third layer 15 is located on the second layer 14, and contains a polyvalent metal compound and a resin. In the first embodiment, the third layer 15 is also a supply source of the polyvalent metal ions that diffuse into the second layer 14. The third layer 15 is formed by coating the second layer 14 with, for example, a coating liquid containing a polyvalent metal compound and a resin, and then drying the coating liquid. The coating solution is applied onto the second layer 14 using the same method as the anchor coat layer described above. The solvent of the coating solution needs to contain at least one of water and an organic solvent. The applied coating liquid may be dried in a temperature environment higher than room temperature. By drying the applied coating liquid, at least part of the solvent contained in the coating liquid is removed.

The third layer 15 has a thickness, for example, in the range of 0.1 μm or more and 0.5 μm or less. When the third layer 15 has a thickness of 0.1 μm or more, the third layer 15 can contain a sufficient amount of the polyvalent metal compound. When the third layer 15 has a thickness of 0.5 μm or less, a reduction in the flexibility of the third layer 15 can be well prevented.

The polyvalent metal compound contained in the third layer 15 is, for example, polyvalent metal, or oxide, hydroxide, carbonate, organic acid salt (such as an acetate salt), or inorganic acid salt of polyvalent metal, or the like. The polyvalent metal compound may be an ammonium complex or secondary to quaternary amine complexes of polyvalent metal oxide, or carbonate or organic acid salt thereof. Examples of the polyvalent metal of the polyvalent metal compound contained in the third layer 15 include an alkaline earth metal, transition metal, and aluminum. The alkaline earth metal is, for example, beryllium, magnesium, or calcium. The transition metal is, for example, titanium, zirconium, chromium, manganese, iron, cobalt, nickel, copper, zinc, or the like. From the viewpoint of heat resistance, manufacturability, and the like, the polyvalent metal compound may be an oxide, hydroxide, chloride, carbonate, or acetate of an alkaline earth metal, cobalt, nickel, copper, zinc, or aluminum. Alternatively, from the above viewpoint, the polyvalent metal compound may be an ammonium complex of copper or zinc. From the viewpoint of industrial productivity, the polyvalent metal compound may be zinc oxide, aluminum oxide, calcium hydroxide, calcium carbonate, zinc acetate, or calcium acetate. Furthermore, considering the viewpoint of heat resistance, water resistance, and transparency, the polyvalent metal compound may be zinc oxide or calcium carbonate.

The resin contained in the third layer 15 is, for example, an alkyd resin, a melamine resin, an acrylic resin, a urethane resin, a polyester resin, a phenol resin, an amino resin, a fluororesin, an epoxy resin, an isocyanate resin, or the like. From the viewpoint of dispersibility of the polyvalent metal compound, the coating solution for forming the third layer 15 may contain a dispersant (such as an anionic surfactant or a nonionic surfactant) and the like. In addition, the coating solution may contain a softener, a stabilizer, a film forming agent, a thickener, and the like.

In the first embodiment, sulfur is present in the third layer 15. This indicates that the sulfur generated from the contents 4 in the heat sterilization treatment is retained inside the third layer 15. The sulfur content of the third layer 15 is, for example in the range of 1.0 atm % or more and 15 atm % or less.

Adhesive Layer and Cover Layer

The adhesive layer 21 is a layer for bonding the gas barrier laminate 10 to the cover layer 22. In the first embodiment, the resin contained in the adhesive layer 21 is, for example, a thermoplastic resin. The thermoplastic resin is, for example, linear low-density polyethylene (LLDPE), polyurethane, polypropylene, an ethylene-unsaturated ester copolymer resin, a polyester copolymer resin, or the like. The cover layer 22 is a resin layer that forms the inner surface of the packaging body 2, and is a sealant for sealing parts of the sheet 3 which are stacked so that the cover layers 22 face each other. The cover layer 22 is, for example, an unstretched polypropylene film (CPP film). The adhesive layer 21 has a thickness, for example, in the range of 1 μm or more and 5 μm or less, and the cover layer 22 has a thickness, for example, in the range of 10 μm or more and 100 μm or less. The adhesive layer 21 is formed, for example, by being applied onto the third layer 15 of the gas barrier laminate 10. The cover layer 22 is formed, for example, by being applied onto the adhesive layer 21.

Shape of Packaging Body

Next, the shape of the packaging body 2 will be described returning to FIG. 1 and FIG. 2. The packaging body 2 has a main body 5 in which the contents 4 are accommodated, a welded portion 6 located at an edge of the main body 5, and a bent portion 7 at which the sheet 3 is bent. An outer surface 2a of the packaging body 2 is composed of the resin substrate 11, and an inner surface 2b of the packaging body 2 is composed of the cover layer 22. As a result, the resin substrate 11, the base layer 12, the first layer 13, the second layer 14, the third layer 15, the adhesive layer 21, and the cover layer 22 are laminated in that order from the outside to the inside of the packaging body 2. In the packaging body 2, one part of the sheet 3 faces the other parts. The inner area of the packaging body 2 is not particularly limited.

The welded portion 6 is a portion at which parts of the sheet 3 are heated and compressed. As a result, at the welded portion 6, the resins of the cover layers 22 that are facing each other are melted and mixed, and are thereby heat sealed.

Figure 4A:
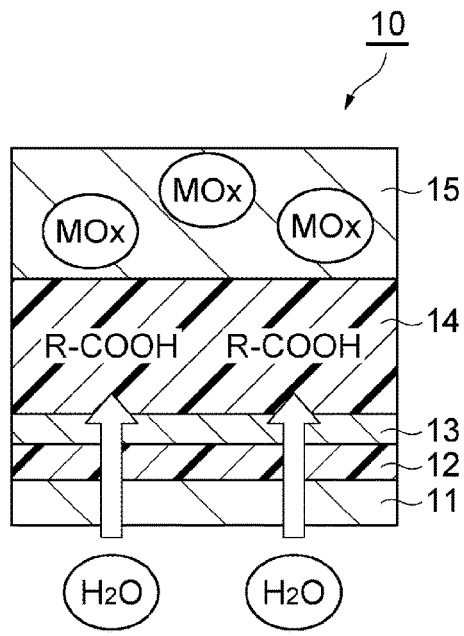
FIGS. 4(a) to (d) are schematic diagrams illustrating a change in the gas barrier laminate during retort treatment.
Figure 4B:
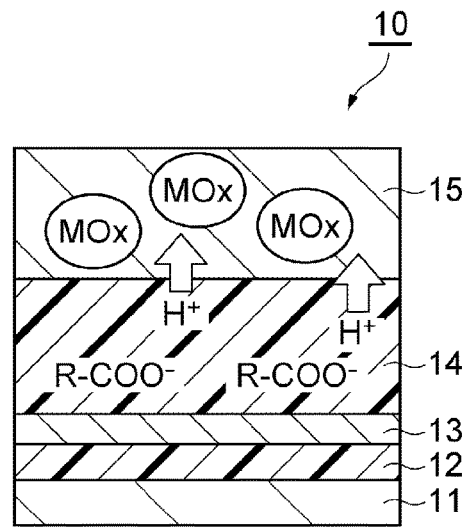
Figure 4C:
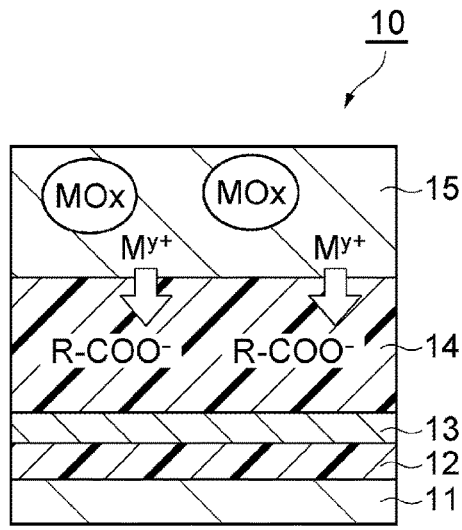
Figure 4D:
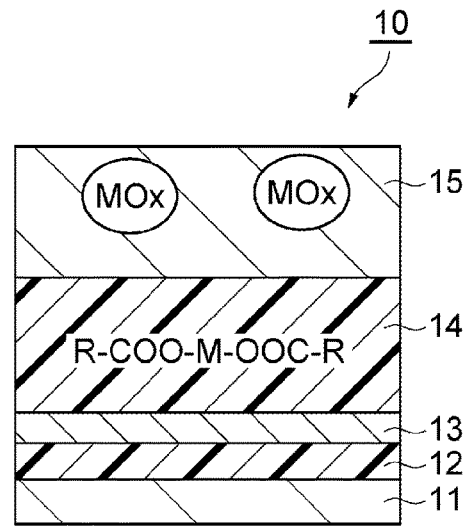
Figure 5A:
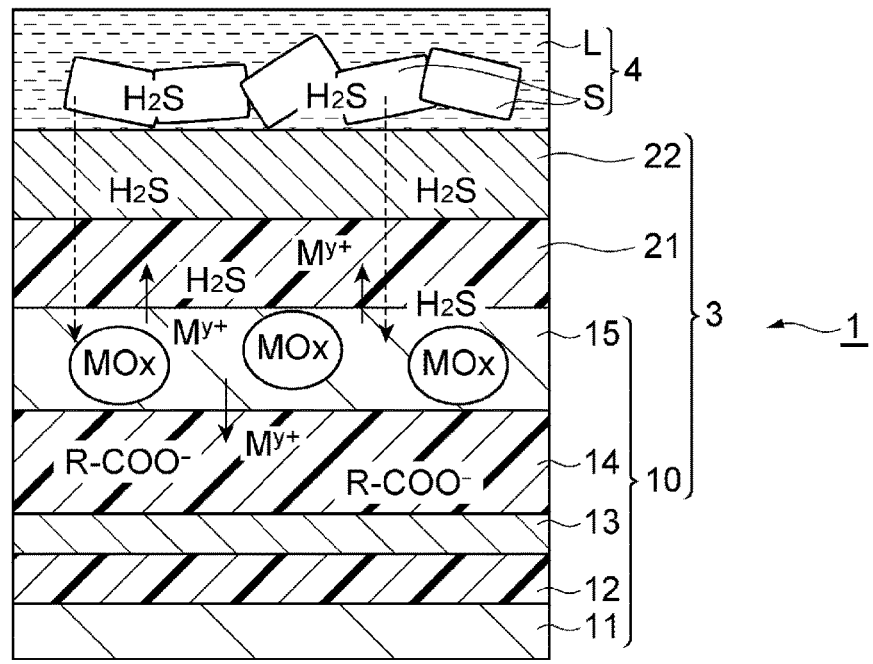
FIGS. 5(a) and (b) are schematic diagrams illustrating a change in the package during retort treatment.

Next, the effects exerted by the package 1 according to the first embodiment will be described with reference to FIGS. 4(a) to (d), and FIGS. 5(a) and (b). FIGS. 4(a) to (d) are schematic diagrams illustrating a change in the gas barrier laminate during retort treatment. FIGS. 5(a) and (b) are schematic diagrams illustrating a change in the package during retort treatment. In the retort treatment, the package 1 and the gas barrier laminate 10 are each heated by water vapor at 125° C. for 30 minutes. The gas barrier laminate 10 is exposed to water vapor from the resin substrate 11 side. In FIGS. 4(a) to (d) and FIGS. 5(a) and (b), "R—COOH" represents a carboxylic acid polymer, "R—COO" represents a carboxylic acid polymer in which a hydrogen ion has been liberated from a carboxyl group, "$MO_x$" represents a polyvalent metal compound, "$M^{y+}$" represents a polyvalent metal ion, and "R—COO-M-OOC—R" represents a structure of the carboxylic acid polymers crosslinked via the polyvalent metal ions. In FIGS. 5(a) and (b), MSz represents a polyvalent metal sulfide.

First, a change in the gas barrier laminate 10 during the retort treatment will be described with reference to FIGS. 4(a) to (d). As shown in FIG. 4(a), during the retort treatment, the gas barrier laminate 10 is exposed to heated water vapor from the resin substrate 11 side. Thus, as shown in FIG. 4(b), hydrogen ions ($H^+$) of the carboxyl groups of the carboxylic acid polymers are liberated. At least some of the liberated hydrogen ions move to the third layer 15 side. Subsequently, as shown in FIG. 4(c), the hydrogen ions that have migrated to the third layer 15 reduce the polyvalent metal compound. As a result, the polyvalent metal ions of the polyvalent metal compound diffuse from the third layer 15. Some of the polyvalent metal ions migrate to the second layer 14. Then, as shown in FIG. 4(d), the carboxylic acid polymers form a crosslinked structure via the polyvalent metal ions that have migrated to the second layer 14. Thus, during the retort treatment, the carboxylic acid polymers chemically react with the polyvalent metal compounds, thereby improving the oxygen barrier properties of the second layer 14. In addition, the polyvalent metal compounds that remain in the third layer 15 have an effect of absorbing retort odor. Therefore, for example, when applying retort treatment to the gas barrier laminate 10, the gas barrier laminate 10 has good oxygen barrier properties and an effect of preventing retort odor.

Next, changes in the package 1 during the retort treatment will be described with reference to FIGS. 5(a) and (b). As shown in FIG. 5(a), during the retort treatment, the change described above occurs in the gas barrier laminate 10 constituting the packaging body 2 of the package 1. The sulfur-containing amino acid contained in the solids S of the contents 4 is heated and reacts with water to generate hydrogen sulfide ($H_2S$) that causes retort odor. For example, when the sulfur-containing amino acid is cysteine, hydrogen sulfide is generated as shown in the following chemical reaction formula.

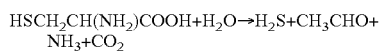

$HSCH_2CH(NH_2)COOH+H_2O \rightarrow H_2S+CH_3CHO+NH_3+CO_2$

Figure 5B:
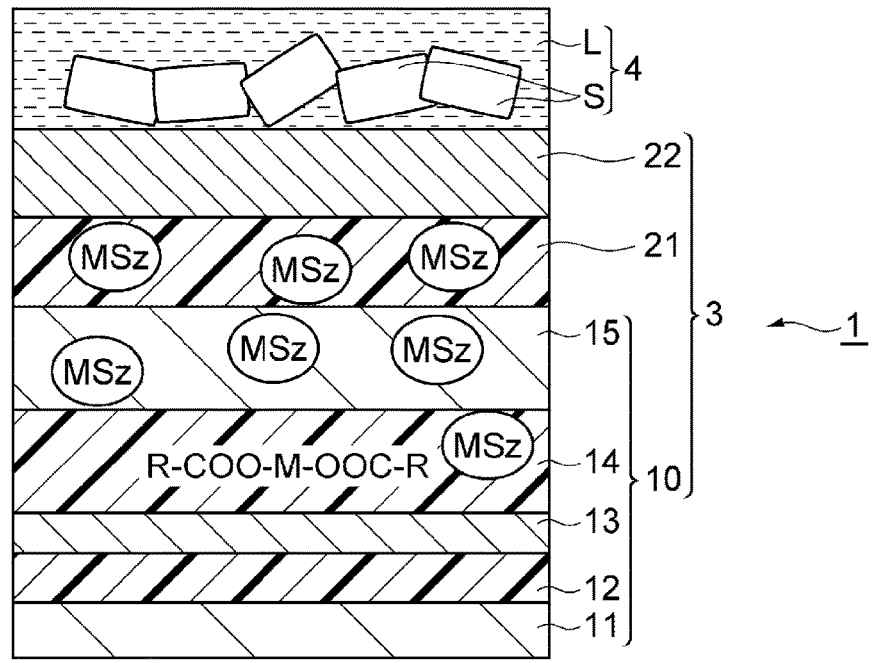

The hydrogen sulfide enters the gas barrier laminate 10 from the third layer 15 side via the cover layer 22 and the adhesive layer 21. The hydrogen sulfide that has entered the third layer 15 chemically reacts with the polyvalent metal compound contained in the third layer 15. As a result, as shown in FIG. 5(b), because a polyvalent metal sulfide is formed in the third layer 15, sulfur is retained in the third layer 15. Therefore, according to the package 1 according to the first embodiment, retort odor can be prevented. Because the thickness of the third layer 15 is 0.1 μm or more, a sufficient amount of the polyvalent metal compound can be contained in the third layer 15.

In addition, in the first embodiment, the sulfur content of the second layer 14 is 1.0 atm % or less. In this case, because the sulfur is well retained in the third layer 15 as described above, the sulfur is suppressed from reaching the second layer 14. Consequently, because the adverse effects of the sulfur on the second layer 14 can be suppressed, the oxygen barrier properties exhibited by the second layer 14 can be maintained. Therefore, by using the package 1 described above, it is possible to achieve both oxygen barrier properties and prevention of retort odor, even when the contents 4 that are accommodated contain a sulfur-containing amino acid.

In the first embodiment, the third layer 15 has a thickness of 0.5 μm or less. As a result, a reduction in the flexibility of the third layer 15 can be well prevented. In addition, cracks and the like do not easily occur in the third layer 15. Therefore, because it becomes more difficult for hydrogen sulfide to reach the second layer 14 via the cracks and the like, the oxygen barrier properties exhibited by the second layer 14 can be well maintained.

In the first embodiment, after being subjected to the retort treatment, the second layer 14 has a crosslinked structure in which the carboxylic acid polymers are crosslinked with each other via the polyvalent metal ions. As a result, the oxygen barrier properties of the second layer 14 are well exhibited.

In the present embodiment, the gas barrier laminate 10 includes the base layer 12, which is located between the resin substrate 11 and the first layer 13 and contains a urethane compound. Consequently, separation of the resin substrate 11 and the first layer 13 is prevented.

In the first embodiment, the sulfur content of the third layer 15 may be 1.0 atm % or more and 15 atm % or less. In this case, because the sulfur generated from the contents 4 is well retained inside the third layer 15, the retort odor is well suppressed.

Second Embodiment

A package according to a second embodiment will be described below. In the description of the second embodiment, descriptions overlapping those of the first embodiment will be omitted, and parts that are different from the first embodiment will be described. That is to say, to the extent technically possible, the description of the first embodiment may be appropriately used for the second embodiment.

The second embodiment is the same as the first embodiment except that zinc oxide, which is a polyvalent metal compound, is used as the basic compound. As a result, the second layer 14 of the second embodiment contains zinc ions, which are polyvalent metal ions, as cations. All of the zinc ions contained in the second layer 14 may be bonded to the carboxylic acid polymer. In the second embodiment, the third layer 15 is also a supply source of the zinc ions that diffuse into the second layer 14.

The thickness of the third layer 15 in the second embodiment is, for example, in the range of 0.1 μm or more and 0.5 μm or less, as in the first embodiment. When the third layer 15 has a thickness of 0.1 μm or more, the third layer 15 can contain a sufficient amount of zinc oxide, which is the polyvalent metal compound. In addition, it is possible to sufficiently prevent a reduction in the oxygen barrier properties of the second layer 14 due to heat sterilization treatment such as retort treatment or boiling treatment. When the third layer 15 has a thickness of 0.5 μm or less, a reduction in the flexibility of the third layer 15 can be well prevented. In the second embodiment, the ratio of the thickness of the third layer 15 to the thickness of the second layer 14 (thickness of third layer/thickness of second layer) is, for example, 1.0 or more. The ratio may be 1.1 or more, 1.27 or more, or 1.67 or more. When the ratio is less than 1.0, it tends to be difficult to achieve both oxygen barrier properties and prevention of retort odor because a sufficient amount of zinc oxide does not remain in the third layer 15 after the heat sterilization treatment. Although upper limit of the ratio is not particularly limited. the second layer 14 may become too thin when the ratio is extremely large. In this case, the oxygen barrier properties of the second layer 14 may not be sufficiently exhibited. In addition, when the ratio is extremely large, the third layer 15 becomes too thick compared to the second layer 14, and the coatability of the third layer 15 may deteriorate. In this case, defects and the like occur in the third layer 15, and there is a tendency for sulfur to reach the second layer 14 via the defects. As a result, it is difficult to achieve both oxygen barrier properties and prevention of retort odor. A ratio which is considered extremely large may vary depending on the thickness of the third layer 15, but such an excessively high ratio may be, for example, 50 or more, 20 or more, or 5 or more.

For example, as the amount of zinc oxide remaining in the packaging body 2 according to the second embodiment increases, the ultraviolet absorbance of the packaging body 2 tends to increase. This is because zinc oxide has a property of absorbing ultraviolet rays. Therefore, at least in the second embodiment, the oxygen barrier properties of the packaging body 2 can be evaluated by the ultraviolet absorbance of the packaging body 2. This is because it can be determined that, as the ultraviolet absorbance of the packaging body 2 increases, more zinc oxide remains in the third layer 15. In other words, the higher the ultraviolet absorbance of the packaging body 2, the more zinc oxide remains in the third layer 15 even after the retort treatment; that is to say, it can be determined that more zinc ions have diffused from the third layer 15 into the second layer 14.

In the second embodiment, the ultraviolet absorbance of the packaging body 2 is 0.05 or more. When the ultraviolet absorbance of the packaging body 2 is 0.05 or more, a sufficient amount of zinc oxide can remain in the third layer 15. Consequently, even after the package 1 has been subjected to retort treatment as described above, the crosslinked structure sufficiently remains in the second layer 14. Therefore, the oxygen barrier properties of the packaging body 2 are well exhibited. The ultraviolet absorbance of the packaging body 2 is, for example, 0.70 or less. In this case, an increase in the cost of the packaging body 2 can be prevented, and the transparency of the packaging body 2 can be maintained.

The ultraviolet absorbance of the packaging body 2 and the third layer 15 corresponds to a value obtained by subtracting the absorbance at a wavelength of 500 nm from the absorbance at a wavelength of 350 nm measured by absorptiometry. For example, the ultraviolet absorbance of the packaging body 2 can be obtained by performing a measurement with respect to a measurement sample formed from a portion of the packaging body 2 using a spectrophotometer. In this case, the spectrophotometer includes, for example, an integrating sphere accessory. The portion of the packaging body 2 corresponds to a portion of the main body 5 which can make contact with the contents 4.

In the packaging body 2, the ultraviolet absorbance of the laminate after excluding the second layer 14 and the third layer 15 is approximately 0.02. As a result, the total value of the ultraviolet absorbance of only the second layer 14 and the third layer 15 may be 0.03 or more in consideration of the ultraviolet absorbance of the laminate.

According to the second embodiment described above, the hydrogen sulfide that has entered the third layer 15 chemically reacts with the zinc oxide contained in the third layer 15. As a result, because zinc sulfide is generated in the third layer 15, the sulfur is retained in the third layer 15. That is to say, hydrogen sulfide is trapped in the third layer 15. Therefore, the package 1 according to the second embodiment is also capable of exerting the effect of preventing retort odor. At least some of the zinc ions generated from the zinc oxide contained in the third layer 15 diffuse into the second layer 14 during the heat sterilization treatment. Then, the diffused zinc ions react with the carboxylic acid polymer. In this case, a crosslinked structure is formed in which the carboxylic acid polymers are ionically crosslinked with each other via zinc ions. As a result, because the oxygen barrier properties of the second layer 14 improve, the first layer 13 and the second layer 14 enable the gas barrier laminate 10 contained in the package 1 to exhibit excellent oxygen barrier properties.

In addition, in the second embodiment, the thickness of the third layer 15 is 0.1 μm or more, and the ratio of the thickness of the third layer 15 to the thickness of the second layer 14 is 1.0 or more, and the ultraviolet absorbance of the packaging body 2 is 0.05 or more. When the thickness of the third layer 15 is 0.1 μm or more, and the ratio is 1.0 or more, a sufficient amount of zinc oxide can be contained in the third layer 15. In other words, a sufficient amount of zinc oxide to enable the carboxylic acid polymer of the second layer 14 to form a crosslinked structure, and a sufficient amount of zinc oxide for generating zinc sulfide in response to the hydrogen sulfide that has entered the third layer 15 can be contained in the third layer 15. Because the ultraviolet absorbance of the packaging body 2 is 0.05 or more after heat sterilization treatment, a sufficient amount of zinc oxide can remain in the third layer 15. That is to say, in a packaging body 2 that satisfies all of the above conditions, even after heat sterilization treatment, a sufficient amount of zinc oxide can remain in the third layer 15, and the amount of zinc ions necessary for the second layer 14 to exhibit oxygen barrier properties can also diffuse into the second layer 14. In this case, because the sulfur is well retained in the third layer 15 as described above, the sulfur is suppressed from reaching the second layer 14. Consequently, because the adverse effects of the sulfur on the second layer 14 can be suppressed, the oxygen barrier properties exhibited by the second layer 14 can be maintained. Therefore, in the second embodiment, it is possible to achieve oxygen barrier properties and prevention of retort odor in the same manner as the first embodiment.

Third Embodiment

A gas barrier laminate used for a package according to a third embodiment will be described below. In the description of the third embodiment, description overlapping that of the first embodiment and the second embodiment will be omitted, and parts that are different from the first embodiment and the second embodiment will be described. That is to say, to the extent technically possible, the descriptions of the first embodiment and the second embodiment may be appropriately used for the third embodiment.

Figure 6:
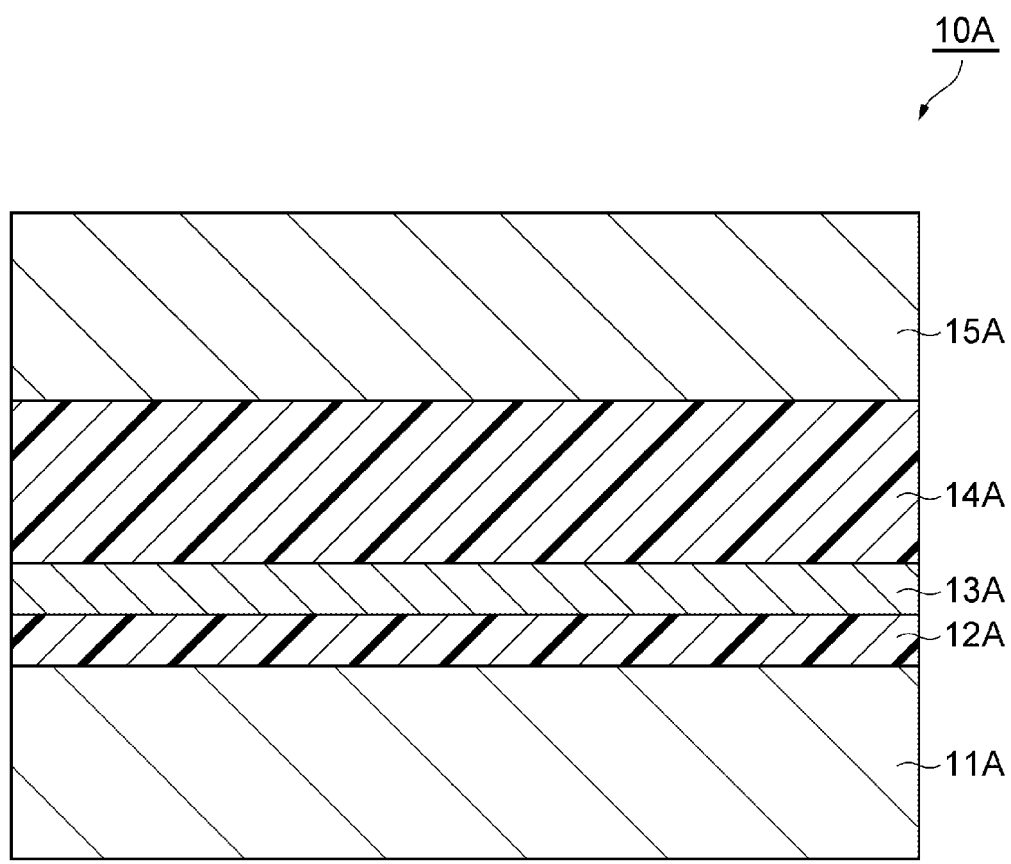
FIG. 6 is a schematic cross-sectional view of a gas barrier laminate according to a third embodiment.

A gas barrier laminate according to the third embodiment will be described below with reference to FIG. 6. FIG. 6 is a schematic cross-sectional view of a gas barrier laminate according to a third embodiment. The gas barrier laminate 10A shown in FIG. 6 is a laminate for use as a packaging body prior to being subjected to retort treatment or boiling treatment. The gas barrier laminate 10A includes a resin substrate 11A, a base layer 12A, a first layer 13A, a second layer 14A, and a third layer 15A. The resin substrate 11A, the base layer 12A, the first layer 13A, the second layer 14A, and the third layer 15A are laminated in this order. The resin substrate 11A, the base layer 12A, and the first layer 13A respectively have the same configurations, or substantially the same configurations, as the resin substrate 11, the base layer 12, and the first layer 13 of the gas barrier laminate 10 shown in FIG. 2. Therefore, the description of the resin substrate 11A, the base layer 12A, and the first layer 13A will be omitted. The shapes of the resin substrate 11A, the base layer 12A, the first layer 13A, the second layer 14A, and the third layer 15A are respectively the same shapes, or substantially the same shapes, as the resin substrate 11, the base layer 12, the first layer 13, the second layer 14, and the third layer 15 of the gas barrier laminate 10.

The second layer 14A is a layer that exhibits oxygen barrier properties in the same manner as the second layer 14 of the gas barrier laminate 10. The second layer 14A contains a carboxylic acid polymer. Because the packaging body using the gas barrier laminate 10A has not been subjected to retort treatment or the like, the second layer 14A substantially does not contain sulfur derived from the contents of the packaging body, and polyvalent metal ions and the like that have diffused from the third layer 15 into the second layer 14.

The third layer 15A is a layer for absorbing sulfur that causes the retort odor in the same manner as the third layer 15 of the gas barrier laminate 10. The third layer 15A contains a polyvalent metal compound and a resin. In the same manner as the second layer 14A, the third layer 15A does not contain sulfur and the like derived from the contents of the packaging body. The content of the polyvalent metal compound is, for example, in the range of 65 mass % or more and 85 mass % or less relative to the mass of the third layer 15A. In the case where the content is 65 mass % or more, when hydrogen sulfide enters the gas barrier laminate 10A from the third layer 15A side, the hydrogen sulfide is successfully retained in the third layer 15A. In other words, when sulfur enters the gas barrier laminate 10A from the third layer 15A side, the hydrogen sulfide (sulfur ions) can be well prevented from reaching the second layer 14A. In addition, at least some of the polyvalent metal ions diffuse into the second layer 14A. As a result, because the crosslinked structure as described above is formed in the second layer 14A, the oxygen barrier properties of the second layer 14A can be well exhibited. Therefore, when the content is 65 mass % or more, it is possible to form the gas barrier laminate 10A capable of achieving both oxygen barrier properties and prevention of retort odor.

When the content is 85 mass % or less, loss of the polyvalent metal compound from the third layer 15A can be prevented. If the polyvalent metal compound is zinc oxide, when the content is 85 mass % or less, light transmissivity of the third layer 15A can be ensured.

A package was formed in which the contents are accommodated in the packaging body formed from the gas barrier laminate 10A. Further, the inner area of the packaging body was 400 cm$^2$, and the contents were 150 mL of a 0.3 mass % cysteine aqueous solution. After performing retort treatment (specifically, heat treatment with water vapor at 125° C. for 30 minutes) with respect to a package set in this manner, the sulfur content in the second layer was 1.0 atm % or less. Thus, by using the gas barrier laminate 10A exhibiting such a result, most of the hydrogen sulfide that has entered the gas barrier laminate 10A was retained in the third layer. That is to say, the hydrogen sulfide is well prevented from reaching the second layer. Consequently, a sufficient number of polyvalent metal ions that are not bound to sulfur are present in the second layer. Therefore, it is possible to prevent the entire crosslinked structure of the second layer from being destroyed by sulfur. Therefore, in the third embodiment, the same effects are exerted as in the first embodiment and the second embodiment.

In the third embodiment, after performing the heat treatment (retort treatment) described above, the sulfur content of the third layer may be 1.0 atm % or more and 15 atm % or less. In this case, because the sulfur generated from the contents is well retained inside the third layer, the retort odor is well suppressed.

In the third embodiment, the polyvalent metal compound is zinc oxide, and the content of the zinc oxide is in the range of 65 mass % or more and 85 mass % or less relative to the mass of the third layer 15. In this case, it is possible to provide a gas barrier laminate 10A that has light transmissivity and can achieve both oxygen barrier properties and prevention of retort odor, and a packaging body using the gas barrier laminate 10A.

In the third embodiment, after being subjected to the heat treatment, the second layer may have a crosslinked structure in which the carboxylic acid polymers are crosslinked with each other via the polyvalent metal ions. In this case, the oxygen barrier properties of the second layer are well exhibited.

The package, the gas barrier laminate, and the packaging body according to an aspect of the present disclosure are not limited to the above embodiments. For example, in the above embodiments, the contents contain both a liquid and solids, or only solids, but the present disclosure is not limited to this. The contents may contain only a liquid. When the contents contain only a liquid, the liquid contains a sulfur-containing amino acid. Furthermore, the packaging body may accommodate the contents in the form of a liquid, a semisolid, or a gel. That is, the packaging body may accommodate a substance such as a liquid in which surface tension can be applied. Specific examples of the contents include food products such as water, oil, drinks, yogurt, jelly, curry, pudding, syrup, jam, mousse, rice porridge, and soup, pharmaceutical products, cosmetics, and chemical products. Alternatively, the packaging body may accommodate, for example, sterilized hygiene-related products, medical supplies, solid food products, or the like.

In the embodiments described above, the gas barrier laminate includes a base layer, but the present disclosure is not limited to this. That is to say, the gas barrier laminate does not have to include a base layer. Instead of a base layer, the gas barrier laminate may include a modified treatment layer formed by applying reactive ion etching (hereinafter also referred to as "RIE") treatment to the first surface of the resin substrate. The modified treatment layer indicates a portion that is located in the vicinity of the surface of the resin substrate and has been modified to be layered by RIE treatment.

In the RIE treatment, plasma is used. Radicals and/or ions generated in the plasma provide a chemical effect of imparting the surface of the resin substrate with a functional group. Ion etching provides a physical effect of removing surface impurities and increasing surface roughness. Consequently, the adhesion between the resin substrate and the first layer is improved by the modified treatment layer, which exhibits the chemical effect and physical effect described above due to the RIE treatment. As a result, detachment is less likely to occur between the resin substrate and the first layer even in a high temperature and high humidity environment, and the heat resistance of the entire gas barrier laminate can also be improved. In addition, it is possible to prevent the occurrence of delamination between the resin substrate and the first layer, deterioration of the gas barrier properties, and the like, when heat treatment such as boiling treatment, retort treatment, and cooking is performed.

The RIE treatment of the resin substrate 11 may be performed by using a known RIE plasma treatment device. The plasma treatment device is, for example, a roll-type in-line plasma treatment device. The roll-type in-line plasma treatment device may be a planar plasma treatment device, a hollow anode plasma treatment device, or the like.

An example of a method of applying RIE treatment to the surface of the resin substrate by a planar plasma treatment device will be described below. The planar plasma treatment device used in the present example includes, in a vacuum chamber, an electrode (cathode), and a cylindrical treatment roll that holds the resin substrate. The electrode is arranged on the inside of the treatment roll. The gas of the RIE treatment method is introduced to the outside of the treatment roll of such a planar plasma treatment device, and a voltage is applied to the electrode while transporting the resin substrate along the processing roll. As a result, plasma is generated on the outside of the treatment roll, the radicals in the plasma are attracted to the treatment roll side, which is the counter electrode, and the radicals act on the surface of the resin substrate. Because the resin substrate is installed on the electrode side, which is the cathode, a high self-bias can be obtained on the resin substrate. As a result of this high self-bias, ions in the plasma are attracted to the resin substrate side. As a result, a sputtering action (physical action) acts on the surface of the resin substrate 11, and the RIE treatment is performed. When plasma treatment is performed by using a device in which the electrode to which a voltage is applied is arranged on the outer side of the treatment roll, the resin substrate is arranged on the anode side. In this case, a high self-bias is not obtained, and only radicals act on the resin substrate. The action of the radicals is only a chemical reaction, and the chemical reaction alone cannot sufficiently improve the adhesion between the resin substrate and the first layer.

Next, an example of a method of applying ME treatment to the surface of the resin substrate by a hollow anode plasma treatment device will be described. A hollow anode plasma treatment device used in the present example includes, in a vacuum chamber, an electrode (anode), a treatment roll that holds the resin substrate and functions as a counter electrode (cathode) of the electrode, a matching box for matching impedance, a gas introduction nozzle, and a shielding plate arranged on both sides of the electrode. The electrode has a box shape opened on the treatment roll side. The gas introduction nozzle is arranged above the electrode. A gas used for the RIE treatment can be introduced into a gap between the electrode, the shielding plate, and the treatment roll. The matching box is arranged behind the electrode and is connected to the electrode. The shielding plate has a curved surface along an outer periphery of the treatment roll, and is arranged on the outer side of the treatment roll to face the treatment roll. As a result of the electrode having a box shape opened toward the treatment roll side, the area (Sa) of the electrode is larger than the area (Sc) of the treated surface of the resin substrate serving as the counter electrode, that is, the size of the opening of the electrode (Sa>Sc).

A gas is introduced into the gap between the electrode, the shielding plate, and the treatment roll of such a hollow anode plasma treatment device, and a voltage is applied to the electrode from the matching box while transporting the resin substrate along the treatment roll. As a result, plasma is generated on the inside of the box-shaped electrode, the radicals in the plasma are attracted to the treatment roll side, which is the counter electrode, and the radicals act on the surface of the resin substrate. Because Sa>Sc, a high self-bias is generated on the resin substrate. As a result of this high self-bias, ions in the plasma are attracted to the resin substrate side. As a result, a sputtering action (physical action) acts on the surface of the resin substrate, and the RIE treatment is performed. When plasma treatment is performed by using a device that does not satisfy Sa>Sc, a high self-bias is not obtained, and only radicals act on the resin substrate. The action of the radicals is only a chemical reaction, and the chemical reaction alone cannot sufficiently improve the adhesion between the resin substrate and the first layer.

The hollow anode plasma treatment device may be a magnetically assisted hollow anode plasma treatment device in which a magnet is incorporated in a box-shaped electrode to form a magnetic electrode. A magnetic field generated from the magnetic electrode further enhances a plasma confinement effect, and due to the high self-bias, a high ion current density can be obtained. Thus, the RIE treatment can be performed at high speed in a stronger and more stable manner.

Examples of the gas used for the RIE treatment include argon, oxygen, nitrogen, and hydrogen. These gases may be used alone or in combination of two or more. In the RIE treatment, two or more of the same plasma treatment devices do not have to be used. For example, the resin substrate may be subjected to treatment using a planar plasma treatment device, successively followed by treatment using a hollow anode plasma treatment device.

In the embodiments above, in the package, the adhesive layer makes contact with the third layer, but the present disclosure is not limited to this. For example, an intermediate layer may be provided between the adhesive layer and the third layer. Furthermore, a printed layer may be provided on the third layer. The printed layer contains, for example, a coating material for displaying characters, figures, or the like, and a transparent resin.

In the above embodiment, after the package is subjected to retort treatment, the second layer has a crosslinked structure in which the carboxylic acid polymers are crosslinked via the polyvalent metal ions, but the present disclosure is not limited to this. In terms of the second layer, the second layer may have the crosslinked structure described above before the package is subjected to retort treatment. In this case, even when the packaging body of the package is not subjected to the retort treatment, the gas barrier laminate has excellent oxygen barrier properties.

EXAMPLES

The present disclosure will be described in more detail with reference to the following examples; however, the present disclosure is not limited to these examples.

Example 1

Gas Barrier Laminate

First, as the resin substrate, a biaxially-stretched polyethylene terephthalate film ("LUMIRROR (registered trademark) P-60" manufactured by Toray Industries Inc., thickness 12 µm, inner side subjected to corona treatment) was prepared. Then, a base layer containing a urethane compound was formed on the resin substrate. The base layer is formed by coating an anchor coating liquid on the resin substrate using a bar coater, and then drying the anchor coating liquid at 150° C. for 1 minute. The dry thickness of the base layer was 0.2 µm. Next, a first layer containing aluminum oxide was formed on the base layer. The first layer was formed by vacuum deposition of aluminum oxide on the base layer. Specifically, a vacuum deposition device using an electron beam heating method was used to evaporate metallic aluminum while introducing oxygen gas into the device. As a result, a first layer having a thickness of 20 nm was formed.

Next, a second layer containing a carboxylic acid polymer was formed on the first layer. The second layer was formed by coating the first layer with a coating liquid α using a bar coater, and then drying the coating liquid α. Specifically, the second layer was formed by drying the coating liquid α coated on the first layer at 80° C. for 5 minutes, performing an aging process at 50° C. for 3 days, and then further performing heat treatment at 200° C. for 5 minutes. The dry thickness of the second layer was 0.15 µm. Then, a third layer containing zinc oxide, which is a polyvalent metal compound, and a resin was formed on the second layer. The third layer was formed by coating the second layer with a coating liquid β by a gravure printing method using a ceramic roller, and then drying the coating liquid β. The dry thickness of the third layer was 0.25 µm. Consequently, the ratio of the thickness of the third layer to the thickness of the second layer was 1.67. As a result, a gas barrier laminate was formed in which the resin substrate, the base layer, the first layer, the second layer, and the third layer were laminated in this order.

The anchor coating liquid used when forming the base layer, the coating liquid α used when forming the second layer, and the coating liquid β used when forming the third layer were as follows.

Anchor coating liquid: 1 part by mass of γ-isocyanatopropyltrimethoxysilane and 5 parts by mass of acrylic polyol were mixed and stirred with ethyl acetate to obtain a solution. Subsequently, tolylene diisocyanate (TDI) was added to the solution so that the amount of isocyanate groups was equal to the amount of hydroxyl groups of the acrylic polyol. Then, the solution was diluted to a concentration of 2 mass % to obtain an anchor coating liquid.

Coating solution α: 20 g of polyacrylic acid aqueous solution ("Aron A-10H" manufactured by Toagosei Co., Ltd., 25-mass % solid concentration) having a number average molecular weight of 200,000 was dissolved in 58.9 g of distilled water. Then, 0.44 g of aminopropyltrimethoxysilane (manufactured by Sigma-Aldrich Japan Co. LLC.) was added and stirred, and this was used as the coating liquid α.

Coating solution β: A mixture of 100 g of an aqueous dispersion of zinc oxide fine particles ("ZE143" manufactured by Sumitomo Osaka Cement Co., Ltd.) and 1 g of a curing agent ("Liofol HAERTER UR 5889-21" manufactured by Henkel) was used as the coating solution β.

Package

A 3 μm-thick adhesive layer containing a polyester polyurethane resin, and a cover layer made of an unstretched polypropylene film (CPP film, "TORAYFAN NO ZK93KM" manufactured by Toray Advanced Film Co., Ltd., thickness 60 μm) were formed on the third layer of the gas barrier laminate described above. As a result, a sheet including a gas barrier laminate, a printed layer, an adhesive layer, and a cover layer was formed.

Next, after folding the sheet obtained above in half, the edge of the sheet was heat welded. The heat welding was performed under conditions of 190° C., 0.3 MPa, and 2 sec by using a tabletop vacuum sealer V-301 (manufactured by Fuji Impulse Co., Ltd.). At this time, at least part of the edge was left unwelded. Consequently, a bag having an opening was formed. Then, the bag was filled with 150 mL of a 0.3 mass % cysteine aqueous solution. Then, the unwelded section of the edge was welded together. As a result, a package provided with a packaging body accommodating the cysteine aqueous solution was formed. The sheet was folded in half so that the inner area of the packaging body was 400 cm$^2$.

Example 2

Except for forming a modified treatment layer on the resin substrate by RIE treatment using a planar plasma treatment device instead of forming a base layer on the resin substrate of Example 1, the gas barrier laminate and the package according to Example 2 were formed in the same manner as in Example 1. That is to say, in Example 2, the first layer was formed on the modified treatment layer. An argon/oxygen mixed gas was introduced into the vacuum chamber as the plasma generating gas. When performing the RIE treatment, the plasma was generated by applying a voltage to the electrode using a high-frequency power supply having a frequency of 13.5 MHz. The power applied to the electrode was 150 W, the self-bias value was 600 V, and the Epd value was 500 W·sec/m$^2$. The Epd value corresponds to the value obtained by multiplying the applied power by the electrode width, and then dividing by the treatment speed and the electrode area, and is also referred to as the value obtained by multiplying the plasma density by the processing time. The electrode width corresponds to the width direction of the resin substrate.

Example 3

In Example 3, except for setting the dry thickness of the third layer to 0.19 μm, and ratio of the thickness of the third layer to the thickness of the second layer to 1.26, the gas barrier laminate and the package according to Example 3 were formed in the same manner as in Example 1.

Comparative Example 1

In Comparative Example 1, except for setting the dry thickness of the third layer to 0.08 μm, the gas barrier laminate and the package according to Comparative Example 1 were formed in the same manner as in Example 1.

Comparative Example 2

In Comparative Example 2, except for setting the dry thickness of the second layer to 0.06 μm, and the dry thickness of the third layer to 0.08 μm, the gas barrier laminate and the package according to Comparative Example 2 were formed in the same manner as in Example 1. Consequently, in Comparative Example 2, the ratio of the thickness of the third layer to the thickness of the second layer was 1.33.

Comparative Example 3

An aluminum foil having a thickness of 9 μm was laminated by dry lamination on a biaxially stretched polyethylene terephthalate film (PET: "Lumirror P60" manufactured by Toray Industries, Inc., 12-μm thickness), thereby obtaining a gas barrier laminate (Al foil laminate). In the same manner as in Example 1 except that the gas barrier laminate was used, a packaging film having a laminated structure including the PET (12 μm), the aluminum foil (9 μm), the adhesive layer (3 μm), and the cover layer (60 μm) was produced.

Comparative Example 4

In Comparative Example 4, except for setting the dry thickness of the second layer to 1.3 μm, and the dry thickness of the third layer to 0.25 μm, the gas barrier laminate and the package according to Comparative Example 4 were formed in the same manner as in Example 1. Consequently, in Comparative Example 4, the ratio of the thickness of the third layer to the thickness of the second layer was 0.19.

Comparative Example 5

In Comparative Example 5, except for setting the dry thickness of the second layer to 1.3 μm, and the dry thickness of the third layer to 0.54 μm, the gas barrier laminate and the package according to Comparative Example 5 were formed in the same manner as in Example 1. Consequently, in Comparative Example 5, the ratio of the thickness of the third layer to the thickness of the second layer was 0.42.

Evaluation Method

The packages obtained in Examples 1 to 3 and Comparative Examples 1 to 5 were tested and evaluated by the methods below.

Sulfur Amount Measurement Test

The packages obtained in Examples 1 to 3 and Comparative Examples 1, 2, 4 and 5 were subjected to retort treatment (specifically, heat treatment with water vapor at 125° C. for 30 minutes). After performing the retort treatment, a portion of the packaging body constituting the package was used as a measurement sample. The portion of the packaging body used was a region that could make contact with the contents. The sulfur content of the second layer and the third layer was measured by performing energy dispersive X-ray spectroscopy (EDX, "EMAX Evolution" manufactured by Horiba Ltd.) with respect to the measurement samples. The sulfur content measurement results for the second layer and the third layer are shown in Table 1 below.

The sulfur content of the second layer of Examples 1 to 3 was 1.0 atm % or less. On the other hand, the sulfur content of the second layer of Comparative Examples 1, 2, 4 and 5 exceeded 1.0 atm %. The sulfur content of the third layer of Examples 1 to 3 and Comparative Examples 1, 2, 4 and 5 was 9 atm % or more and 11 atm % or less. From these results, it can be seen that the third layer in each of Examples 1 to 3 and Comparative Examples 1, 2, 4 and 5 contained sulfur.

Ultraviolet Absorbance Measurement Test

The measurement samples were prepared in the same manner as the sulfur amount measurement test from a portion of the packaging bodies obtained in Examples 1 to 3 and Comparative Examples 1, 2, 4 and 5 following the retort treatment. A spectrophotometer (ultraviolet-visible spectrophotometer "UV-2450" manufactured by Shimadzu Corporation) was used with respect to the measurement samples. For the measurement, an integrating sphere attachment device was used. The measurement range was set to a wavelength range of 300 to 550 nm. A value obtained by subtracting the absorbance of the measurement sample at a wavelength of 500 nm from the absorbance of the measurement sample at a wavelength of 350 nm was used as the ultraviolet absorbance of the measurement sample. Table 2 shows the measurement results.

The ultraviolet absorbance of Examples 1 to 3 was 0.07 or more. On the other hand, the ultraviolet absorbance of Comparative Examples 1, 2, 4 and 5 was less than 0.05. That is to say, the ultraviolet absorbance of Examples 1 to 3 was higher than that of Comparative Examples 1, 2, 4 and 5. From this result, it can be seen that the content of zinc oxide, which is the polyvalent metal compound, in the third layer of Examples 1 to 3 was higher than that of Comparative Examples 1, 2, 4 and 5.

Oxygen Permeability Measurement Test

The measurement samples were prepared in the same manner as the sulfur amount measurement test from a portion of the packaging bodies obtained in Examples 1 to 3 and Comparative Examples 1, 2, 4 and 5 following the retort treatment. The oxygen permeability was measured for the measurement samples under measurement conditions of a temperature of 30° C. and a relative humidity of 70% by using an oxygen permeability measuring device (OX-TRAN2/20 manufactured by Modern Control, Inc.). Table 2 shows the measurement results.

The oxygen permeability of the measurement samples obtained in Examples 1 to 3 was 0.1 cc/m$^2$·day·atm. On the other hand, oxygen permeability of the measurement samples obtained in Comparative Examples 1, 2, 4 and 5 was 45 cc/m$^2$·day·atm or more. From these results, it can be seen that the oxygen permeability of Comparative Examples 1, 2, 4 and 5 is significantly larger than the oxygen permeability of Examples 1 to 3. In Comparative Examples 1, 2, 4 and 5, it can be inferred that destruction of the crosslinked structure between the carboxylic acid polymers via the zinc ions has progressed due to hydrogen sulfide reaching the second layer. From the viewpoint of the thickness of the third layer, it can be inferred that, in Comparative Examples 1 and 2, a sufficient amount of zinc ions was not present in the second layer due to the third layer being too thin. In Comparative Examples 4 and 5, based on the results of the ultraviolet absorbance measurement test, it can be inferred that a large amount of zinc oxide was dispersed in the second layer during heat sterilization treatment, and a sufficient amount of zinc oxide did not remain in the third layer after heat sterilization treatment. Consequently, in Comparative Examples 4 and 5, it can be inferred that hydrogen sulfide was not sufficiently trapped by the third layer. In Comparative Example 5, defects such as cracks were formed in the third layer due to the third layer being too thick, and it can be inferred that hydrogen sulfide may have reached the second layer via the cracks.

Retort Odor Measurement Test

The amount of hydrogen sulfide inside the packages obtained in Examples 1 to 3 and Comparative Examples 1 to 5 after retort treatment was measured by using a Kitagawa gas detector (gas sampler AP-20 and hydrogen sulfide detector tube manufactured by Komyo Rikagaku Kogyo K.K.). Table 2 shows the measurement results.

The hydrogen sulfide measurement result in Example 1 was 35 ppm, and the hydrogen sulfide measurement result in Examples 2 and 3 and Comparative Example 1 was 40 ppm. On the other hand, the hydrogen sulfide measurement result in Comparative Examples 2, 4 and 5 was 45 ppm or more, and the hydrogen sulfide measurement result in Comparative Example 3 was 90 ppm. From these results, it can be seen that each of Examples 1 to 3 and Comparative Examples 1, 2, 4 and 5 absorbed more hydrogen sulfide than Comparative Example 3. The absorbed amount of hydrogen sulfide in Comparative Examples 2, 4 and 5 was greater than in Examples 1 to 3. From this result, it can be inferred that in Comparative Examples 2, 4 and 5, a sufficient amount of zinc oxide does not remain in the third layer after the heat sterilization treatment.

TABLE 1

|  | Base layer | Thickness of second layer (μm) | Thickness of third layer (μm) | Thickness of third layer (μm)/ thickness of second layer (μm) | Sulfur content of second layer (atm %) | Sulfur content of third layer (atm %) |
|---|---|---|---|---|---|---|
| Example 1 | YES | 0.15 | 0.25 | 1.67 | 0.6 | 11 |
| Example 2 | NO (Modified Treatment Layer) | 0.15 | 0.25 | 1.67 | 0.5 | 11 |
| Example 3 | YES | 0.15 | 0.19 | 1.27 | 0.6 | 9 |
| Comparative Example 1 | YES | 0.15 | 0.08 | 0.53 | 2 | 9 |
| Comparative Example 2 | YES | 0.06 | 0.08 | 1.33 | 1.8 | 10 |
| Comparative Example 3 | NO | — | — | — | — | — |
| Comparative Example 4 | YES | 1.3 | 0.25 | 0.19 | 1.2 | 9 |
| Comparative Example 5 | YES | 1.3 | 0.54 | 0.42 | 1.2 | 9 |

TABLE 2

|  | Ultraviolet absorbance | Oxygen permeability (cc/(m²-day-atm)) | Hydrogen sulfide amount (ppm) |
|---|---|---|---|
| Example 1 | 0.17 | 0.1 | 35 |
| Example 2 | 0.17 | 0.1 | 40 |
| Example 3 | 0.07 | 0.1 | 40 |
| Comparative Example 1 | 0.04 | 45 | 40 |
| Comparative Example 2 | 0.04 | 50 | 45 |
| Comparative Example 3 | — | — | 90 |
| Comparative Example 4 | 0.04 | 60 | 55 |
| Comparative Example 5 | 0.04 | 45 | 55 |

Reference Signs List 1 . . . Package; 2 . . . Packaging body; 2a . . . Outer surface; 2b . . . Inner surface; 3 . . . Sheet; 4 . . . Contents; 5 . . . Main body; 6 . . . Welded portion; 10, 10A . . . Gas barrier laminate; 11, 11A . . . Resin substrate; 12, 12A . . . Base layer; 13, 13A . . . First layer; 14, 14A . . . Second layer; 15, 15A . . . Third layer; 21 . . . Adhesive layer; 22 . . . Cover layer.

What is claimed is:

1. A gas barrier laminate used for a packaging body for retort treatment or boiling treatment, comprising:
   a resin substrate;
   a first layer which is located on the resin substrate, and includes an inorganic oxide;
   a second layer which is located on the first layer, and includes a carboxylic acid polymer;
   a third layer which is located on the second layer, and includes a polyvalent metal compound and a resin; wherein
   a thickness of the third layer is 0.1 μm to 0.5 μm,
   a ratio between the thickness of the third layer and a thickness of the second layer is 1.0 to 5; and
   when 150 mL of a 0.3 mass % cysteine aqueous solution is accommodated in a packaging body constituted by the gas barrier laminate and having an inner area of 400 cm², and after the packaging body is subjected to heat treatment with water vapor at 125° C. for 30 minutes, a sulfur content of the second layer is 1.0 atm % or less; and wherein
   the polyvalent metal compound is zinc oxide, and
   a content of the zinc oxide relative to a mass of the third layer is 65 mass % or more and 85 mass % or less.

2. The gas barrier laminate of claim 1, wherein
   the third layer has a sulfur content of 1.0 atm % or more and 15 atm % or less after performing the heat treatment.

3. The gas barrier laminate of claim 1, wherein
   after the heat treatment, the second layer has a crosslinked structure in which the carboxylic acid polymers are crosslinked to each other via polyvalent metal ions.

4. The gas barrier laminate of claim 1, further including
   a base layer which is located between the resin substrate and the first layer, and includes an organic compound.

5. The gas barrier laminate of claim 1, wherein the ratio between the thickness of the third layer and the thickness of the second layer is 1.27 to 5.

6. The gas barrier laminate of claim 1, wherein the ratio between the thickness of the third layer and the thickness of the second layer is 1.27 to 1.67.

7. A packaging body including a gas barrier laminate of claim 1.

* * * * *